United States Patent
Chu et al.

(10) Patent No.: US 11,423,518 B2
(45) Date of Patent: Aug. 23, 2022

(54) METHOD AND DEVICE OF CORRECTING IMAGE DISTORTION, DISPLAY DEVICE, COMPUTER READABLE MEDIUM, ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Minglei Chu, Beijing (CN); Hao Zhang, Beijing (CN); Lili Chen, Beijing (CN); Chenru Wang, Beijing (CN); Yali Liu, Beijing (CN); Yukun Sun, Beijing (CN); Guixin Yan, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 544 days.

(21) Appl. No.: 16/473,110

(22) PCT Filed: Jan. 10, 2019

(86) PCT No.: PCT/CN2019/071091
§ 371 (c)(1),
(2) Date: Jun. 24, 2019

(87) PCT Pub. No.: WO2019/205744
PCT Pub. Date: Oct. 31, 2019

(65) Prior Publication Data
US 2021/0358093 A1    Nov. 18, 2021

(30) Foreign Application Priority Data
Apr. 28, 2018    (CN) .......................... 201810403187.8

(51) Int. Cl.
*G06T 5/00*    (2006.01)
*G06T 5/50*    (2006.01)
*G06V 10/22*    (2022.01)

(52) U.S. Cl.
CPC ................ *G06T 5/006* (2013.01); *G06T 5/50* (2013.01); *G06V 10/22* (2022.01)

(58) Field of Classification Search
CPC . G06T 5/006; G06T 5/50; G06T 2207/20092; G06T 7/60;
(Continued)

(56) References Cited

U.S. PATENT DOCUMENTS 5,818,527 A * 10/1998 Yamaguchi .......... H04N 5/2628
348/335
6,538,691 B1 * 3/2003 Macy .................... H04N 3/2335
348/222.1

(Continued)

FOREIGN PATENT DOCUMENTS

| CN | 107432750 A | 12/2017 |
| CN | 107610044 A | 1/2018 |

(Continued)

OTHER PUBLICATIONS

International Search Report of PCT/CN2019/071091 in Chinese, dated Apr. 10, 2019, with English translation.
(Continued)

*Primary Examiner* — Phuoc Tran
(74) *Attorney, Agent, or Firm* — Collard & Roe, P.C.

(57) ABSTRACT

A method and a device of correcting image distortion, a display device, a computer readable medium and an electronic device. The method of correcting image distortion includes: forming a correction grid on an imaging screen of a display device, the correction grid including a plurality of to-be-adjusted grid points; forming a circle on the correction
(Continued)

grid; and moving the to-be-adjusted grid point on and outside the circle, to correct image distortion.

16 Claims, 6 Drawing Sheets

(58) Field of Classification Search
CPC ........ G06T 2207/10012; G06K 9/2054; G06K 9/3208; H04N 5/232
See application file for complete search history.

(56) References Cited

U.S. PATENT DOCUMENTS

| | | | |
|---|---|---|---|
| 7,881,563 B2* | 2/2011 | Mandy | ............... H04N 9/04515 |
| | | | 382/300 |
| 2005/0105822 A1* | 5/2005 | Narita | ..................... G06T 5/006 |
| | | | 382/275 |
| 2016/0314564 A1 | 10/2016 | Jones et al. | |
| 2017/0336641 A1 | 11/2017 | Von Und Zu Liechtenstein | |
| 2019/0029632 A1 | 1/2019 | Vang et al. | |
| 2019/0222824 A1* | 7/2019 | Sheridan | .................. H04N 5/00 |
| 2020/0273205 A1* | 8/2020 | Yamashita | .............. G06T 15/20 |

FOREIGN PATENT DOCUMENTS

| | | |
|---|---|---|
| CN | 107850777 A | 3/2018 |
| CN | 108596854 A | 9/2018 |

OTHER PUBLICATIONS

Notice of Transmittal of the International Search Report of PCT/CN2019/071091 in Chinese, dated Apr. 10, 2019.

Written Opinion of the International Searching Authority of PCT/CN2019/071091 in Chinese, dated Apr. 10, 2019 with English translation.

* cited by examiner

METHOD AND DEVICE OF CORRECTING IMAGE DISTORTION, DISPLAY DEVICE, COMPUTER READABLE MEDIUM, ELECTRONIC DEVICE

CROSS REFERENCE TO RELATED APPLICATIONS

This application is the National Stage of PCT/CN2019/071091 filed on Jan. 10, 2019, which claims priority under 35 U.S.C. § 119 of Chinese Application No. 201810403187.8 filed on Apr. 28, 2018, the disclosure of which is incorporated by reference.

TECHNICAL FIELD

The present disclosure relates to the field of display, and in particular to a method and a device of correcting image distortion, a display device, a computer readable medium and an electronic device.

BACKGROUND

Virtual reality technology involves virtualizing the real world through a computer, and projecting the virtualized real world to retinas of human eyes through a display screen and a visual system and with the help of other input devices sensed by human bodies, thereby simulating a virtual world, which is very realistic in aspects of vision, auditory sense, tactile sense, or the like. The nature of the virtual reality technology is to present an object in a first-person view in a three-dimensional (3D) space which may be observed by the user in real time without limit, thereby providing the user with an experience of immersion. Including various technologies, such as tracking and sensing, wide-angle stereo display, stereo, tactile feedback, or the like, the virtual reality technology has found wide applications in the fields of entertainment, military training, medical training, 3D virtual display of a product, or the like.

It should be stated that the information disclosed in the above-mentioned Background section is merely used for enhancing understanding of the background of the present disclosure, and may include information which does not constitute the prior art known by persons skilled in the art.

SUMMARY

The present disclosure provides a method and a device of correcting image distortion, a computer readable medium and an electronic device.

Other features and advantages of the present disclosure will become apparent from the following description, or may be partially learned by the practice of the disclosure.

At least one embodiment of the present disclosure provides a method of correcting image distortion, which includes:

forming a correction grid on an imaging screen of a display device, the correction grid comprising a plurality of to-be-adjusted grid points;

forming a circle on the correction grid; and moving the to-be-adjusted grid point on and outside the circle, to correct image distortion.

In the method of correcting image distortion according to an exemplary embodiment of the present disclosure, the forming the circle on the correction grid comprises:

establishing a two-dimensional coordinate system on the correction grid; and forming the circle with an origin of the two-dimensional coordinate system as a center and a distance from one of the plurality of to-be-adjusted grid points to the origin as a radius.

In the method of correcting image distortion according to an exemplary embodiment of the present disclosure, the forming the correction grid on the imaging screen of the display device comprises:

forming an initial grid on a display screen of the display device based on an optical parameter of the display device; and imaging the initial grid through a lens arranged at a side of the display screen, to form the correction grid on the imaging screen.

In the method of correcting image distortion according to an exemplary embodiment of the present disclosure, the display device comprises a first lens and a second lens which are symmetrically arranged; and the forming the correction grid on the imaging screen comprises:

imaging the initial grid through the first lens and the second lens, to form a first correction grid and a second correction grids on the imaging screen, wherein the first correction grid and the second correction grid are symmetrical to each other.

In the method of correcting image distortion according to an exemplary embodiment of the present disclosure, the establishing the two-dimensional coordinate system on the correction grid comprises:

establishing the two-dimensional coordinate system in a horizontal direction and a vertical direction by taking an orthographic projection point of the center of the lens on the display screen as the origin; and imaging the two-dimensional coordinate system on the correction grid through the lens.

The method of correcting image distortion according to an exemplary embodiment of the present disclosure further includes:

selecting the to-be-adjusted grid point which is required to be adjusted, according to whether a grid line in the correction grid is straight, so as to adjust the to-be-adjusted grid point on and outside the circle where the to-be-adjusted grid point which is required to be adjusted is located.

In the method of correcting image distortion according to an exemplary embodiment of the present disclosure, the moving the to-be-adjusted grid point on and outside the circle comprises:

moving the to-be-adjusted grid point in a direction parallel with an abscissa axis or an ordinate axis of the two-dimensional coordinate system to make the grid line of the correction grid straight.

In the method of correcting image distortion according to an exemplary embodiment of the present disclosure, all grid points located on and outside the circle also move close to or away from the center in a case where the to-be-adjusted grid point is moved.

The method of correcting image distortion according to an exemplary embodiment of the present disclosure further includes:

adjusting the to-be-adjusted grid point in the first correction grid; and adjusting the position of the to-be-adjusted grid point in the second correction grid corresponding to the to-be-adjusted grid point in the first correction grid synchronously, based on a displacement of the to-be-adjusted grid point in the first correction grid.

The method of correcting image distortion according to an exemplary embodiment of the present disclosure further includes:

adjusting the to-be-adjusted grid point repeatedly by using different visual parameters, and determining a final adjustment position based on a result of the repeatedly adjusting.

The method of correcting image distortion according to an exemplary embodiment of the present disclosure further includes:

obtaining a plurality of subcorrection grids corresponding to different colors, and adjusting the plurality of subcorrection grids to correct the distortion in the different colors.

At least one embodiment of the present disclosure provides a device of correcting image distortion, which includes:

a correction grid generating module, configured for forming a correction grid on an imaging screen of a display device, the correction grid comprising a plurality of to-be-adjusted grid points;

a coordinate system establishing module, configured for forming a circle on the correction grid; and an image distortion correcting module, configured for moving the to-be-adjusted grid point on and outside the circle, to correct image distortion.

In the device of correcting image distortion according to an exemplary embodiment of the present disclosure, the coordinate system establishing module is further configured for:

establishing a two-dimensional coordinate system on the correction grid; and forming the circle with an origin of the two-dimensional coordinate system as a center and a distance from one of the plurality of to-be-adjusted grid points to the origin as a radius, and the image distortion correcting module is further configured for: moving the to-be-adjusted grid point located on and outside the circle with an origin of the two-dimensional coordinate system as a center and the distance from one of the plurality of to-be-adjusted grid points to the origin as a radius, to correct image distortion.

At least one embodiment of the present disclosure provides a display device, comprising the above-mentioned device of correcting image distortion.

At least one embodiment of the present disclosure provides a method of correcting image distortion, which includes:

obtaining a correction grid corresponding to an initial grid, the correction grid comprising a plurality of to-be-adjusted grid points;

determining a reference point on a plane where the correction grid is located; and moving the to-be-adjusted grid point having a distance to the reference point greater than or equal to a preset value, to correct image distortion.

In the method of correcting image distortion according to an exemplary embodiment of the present disclosure, the moving the to-be-adjusted grid point having the distance to the reference point greater than or equal to a first threshold to correct image distortion further comprises:

keeping the to-be-adjusted grid point having a distance to the reference point less than the preset value still.

The method of correcting image distortion according to an exemplary embodiment of the present disclosure further includes:

selecting the to-be-adjusted grid point which is required to be adjusted, according to whether a grid line of the correction grid is straight.

In the method of correcting image distortion according to an exemplary embodiment of the present disclosure, the moving the to-be-adjusted grid point having the distance to the reference point greater than or equal to the preset value to correct image distortion further comprises:

moving the to-be-adjusted grid point having the distance to the reference point greater than or equal to the preset value to make the grid line where the moved to-be-adjusted grid point is located to be straight.

At least one embodiment of the present disclosure provides a computer readable medium, storing a computer program, which, when executed by a processor, implements the above-mentioned method of correcting image distortion.

At least one embodiment of the present disclosure provides an electronic device, which includes:

one or more processors;

a storage device, configured for storing one or more programs, which, when executed by the one or more processors, cause the one or more processors to implement the above-mentioned method of correcting image distortion.

It could be understood that both the foregoing general description and the following detailed description are exemplary and explanatory only, and are not limitative to the present disclosure.

BRIEF DESCRIPTION OF THE DRAWINGS

The accompanying drawings, which are incorporated in and constitute a part of this specification, illustrate the embodiments of the present disclosure and together with the description, serve to explain the principles of the present disclosure. It is apparent that the drawings in the following description are related to only some of the embodiments of the present disclosure, and other drawings may be obtained by those skilled in the art based on these drawings without any creative efforts.

DETAILED DESCRIPTION

Figure 1:
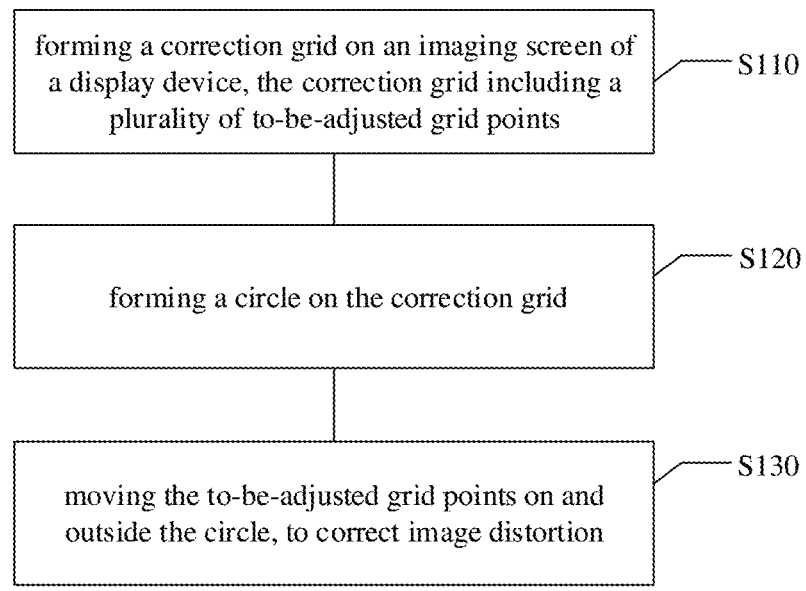
FIG. 1 is a flow chart of a method of correcting image distortion according to exemplary embodiments of the present disclosure.

Now exemplary embodiments will be described more fully with reference to the accompanying drawings. However, the exemplary embodiments may be implemented in many forms and should not be construed as limited to the examples set forth herein. Rather, the provision of such embodiments makes the present disclosure more thorough and complete, and may fully convey the concepts of the exemplary embodiments to those skilled in the art. The features, structures, or characteristics described may be combined in one or more embodiments in any suitable manner. In the following description, numerous specific details are provided to give full understandings of the embodiments of the present disclosure. However, those skilled in the art will appreciate that, technical solutions provided in the resent disclosure may be practiced but omitting one or more specific details, or by other methods, components, apparatus, steps, etc. In other cases, well-known structures, methods, apparatus, implements, materials, or operations will not be shown or described in detail to avoid obscuring aspects of the present disclosure.

In the specification, the terms "a", "an", "the" and "said" are used to express the presence of one or more element/constitute/or the like; the terms "include", and "have" are intended to be inclusive, and mean there may be additional elements/constituents/or the like other than the listed elements/constituents/or the like; and the terms "first" and "second" are merely used to distinguish elements, instead of limiting the number of the elements.

In addition, the accompanying drawings are merely schematic illustrations of the present disclosure and are not drawn to scale. The same reference numerals in accompanying drawings represent the same or similar elements, and thereby their description may not be repeated. Some blocks shown in the accompanying drawings are functional entities that do not necessarily correspond to physically or logically separate entities.

In order to give the user the realistic experience of immersion visually, the virtual reality device is required to cover visual ranges of human eyes as far as possible. Usually, a big and bent spherical display is provided in the virtual reality device or an additional lens is provided in front of the display screen, so as to obtain a bigger viewing angle. However, the spherical display is heavy and expensive, so a lens may be arranged in front of the rectangular display screen. When a normal image is projected to human eyes using the lens, the edge of observed image is distorted, and the human eyes cannot obtain its location in a virtual space; moreover, the distortion caused by the lens is inevitable, and with an increase in FOV, the distortion of an edge image becomes more obvious. Due to the distortion, the effect becomes worse after the overlapping of the visual fields of two eyes, and even the image cannot be viewed normally.

The present disclosure provides a method of correcting image distortion, including:

obtaining a correction grid corresponding to an initial grid, the correction grid including a plurality of to-be-adjusted grid points;

determining a reference point on a plane where the correction grid is located; and moving the to-be-adjusted grid point having a distance to the reference point greater than or equal to a preset value, to correct image distortion.

In some exemplary embodiments of the present disclosure, the step of moving the to-be-adjusted grid point having a distance to the reference point greater than or equal to a preset value to correct image distortion may further include: keeping the to-be-adjusted grid point having a distance to the reference point less than the preset value still.

In some exemplary embodiments of the present disclosure, the above-mentioned method of correcting image distortion may further include:

selecting the to-be-adjusted grid point which is required to be adjusted, according to whether a grid line of the correction grid is straight.

In some exemplary embodiments of the present disclosure, the step of moving to-be-adjusted grid point having a distance to the reference point greater than or equal to a preset value to correct image distortion may further include: moving the to-be-adjusted grid point having a distance to the reference point greater than or equal to the preset value, so that the grid line where the moved to-be-adjusted grid point is located is straight.

The method of correcting image distortion according to some embodiments of the present disclosure will be described in detail in combination with the display device.

FIG. 1 is a flow chart of a method of correcting image correction. As shown in FIG. 1, the flow is as follows.

S110: forming a correction grid on an imaging screen of a display device, the correction grid including a plurality of to-be-adjusted grid points;

S120: forming a circle on the correction grid;

S130: moving the to-be-adjusted grid points on and outside the circle, to correct image distortion.

It should be understood that in the present disclosure, "forming a circle" on the correction grid refers to forming a real solid circle on the grid, or forming a virtual or imaginary circle, for determining the to-be-adjusted grid points which are to be adjusted.

Hereinafter, the steps in the method of correcting image correction according to the present disclosure will be explained in detail.

In S110, a correction grid is formed on an imaging screen of a display device, the correction grid including a plurality of to-be-adjusted grid points.

Figure 2:
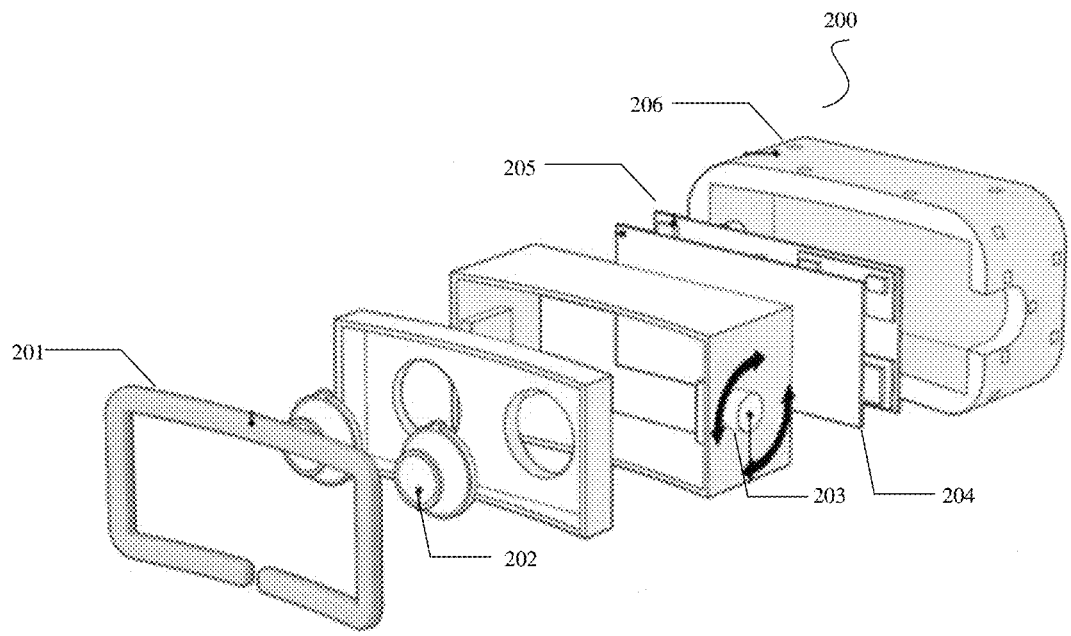
FIG. 2 is a schematic structural diagram of a virtual reality device according to exemplary embodiments of the present disclosure.
Figure 3:
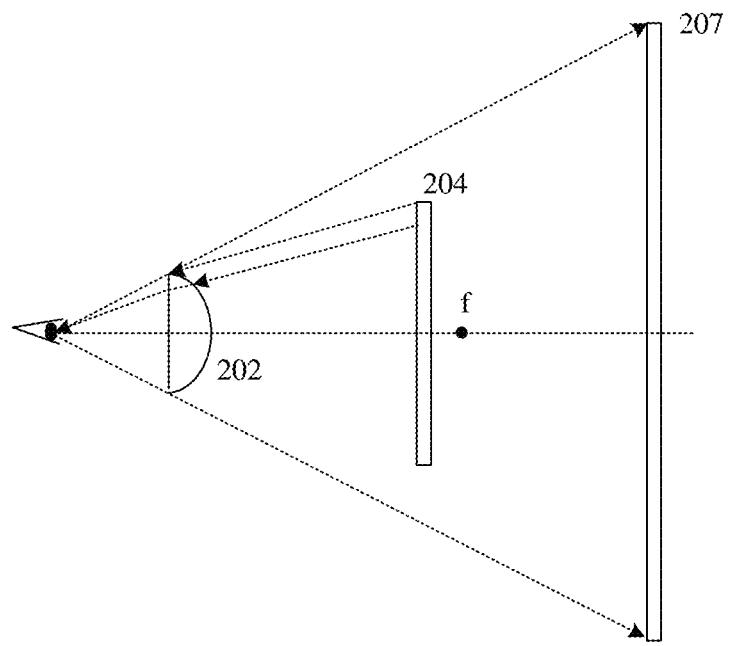
FIG. 3 is a schematic imaging diagram of the virtual reality device according to exemplary embodiments of the present disclosure.

In the exemplary embodiments of the present disclosure, as the display device, a virtual reality device or an augmented reality device, or other large field-of-view optical display devices may be used. For the sake of understanding, the present disclosure is explained by taking the virtual reality device as an example. FIG. 2 is a schematic structural diagram of a virtual reality device. The virtual reality device 200 includes a foam pad 201, a lens 202, an adjusting knob 203, a display screen 204, a circuit board 205 and a housing 206, wherein the lens 202 includes first and second lens which are symmetrical (for example, with respect to a perpendicular bisector of a connection line of pupils of the user's eyes). FIG. 3 is an optical path diagram of the imaging of the virtual reality device. As shown in FIG. 3, the center of the lens 202 is located at a half of a height of the display screen 204, and coincides with an optical axis of human eyes. The display screen 204 is located within a focal length f of the lens 202, and a virtual image may be formed on the imaging screen 207 behind the display screen 204. It should be noted that the imaging screen 207 may be or may not be a subsistent part in the display device. For example, for the virtual reality device, the imaging screen is merely a plane where the virtual image is located, rather than a subsistent part in the device. In addition, it should be understood that this imaging screen may also be a simulation program of this display device or simulation display of this imaging screen in the simulation device, and the present disclosure has no limitation in this aspect.

In the exemplary embodiments of the present disclosure, firstly, parameters of the optical system of the virtual reality device 200 may be obtained based on the lens parameters and structural parameters of the virtual reality device 200. The lens parameters may include a focal length, thickness, refractive index of the lens 202, or the like; the structural parameters may include a size, object distance, distance of exit pupil, pitch between lens centers, screen pitch, or the like, wherein the object distance of the display screen 204 is the distance from the display screen 204 to the center of the lens 202, and the distance of exit pupil is the distance from the eye to the center of the lens 202. After the parameters of the optical system of the virtual reality device 200 are obtained, a relation between an object height and an image height or a field angle may be tested according to the parameters of the optical system, and a plurality of initial grid points is formed on the display screen 204, and connected to form an initial grid. In the present disclosure, the number of initial grid points may be set based on actual requirements, for example, to form 65×65 initial grid points to divide the display screen 204 into 64×64 parts.

Figure 4:
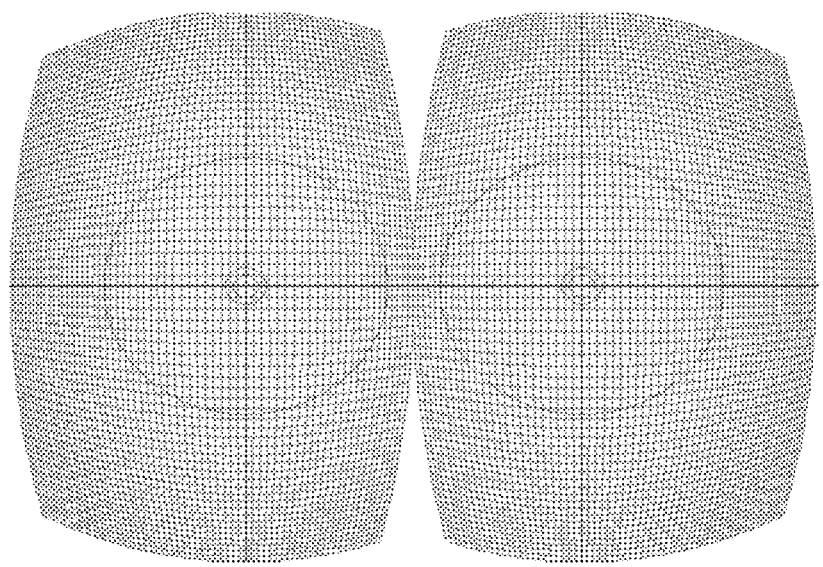
FIG. 4 is a schematic structural diagram of a correction grid according to exemplary embodiments of the present disclosure.

In the exemplary embodiments of the present disclosure, after the initial grid is formed on the display screen of the display device, the initial grid may be imaged through the lens arranged at a side of the display screen of the display device, to form a correction grid on the imaging screen. FIG. 4 is a schematic structural diagram of a correction grid. As shown in FIG. 4, the correction grid includes a plurality of to-be-adjusted grid points, and the image distortion may be corrected by adjusting the position of the to-be-adjusted grid point. Usually, the image distortion is divided into barrel distortion and pillow distortion. In the barrel distortion, after the normal image is imaged through the lens, the periphery of the image moves away from the image center, and the shape looks like a barrel; whereas in the pillow distortion, after the normal image is imaged through the lens, the periphery of the image moves close to the image center, and a pillow-shaped image is formed. In the virtual reality device 200, the initial grid may be imaged to form first and second correction grids on the imaging screen 207 through the first and second lens of the lens 202. Since the lens imaging distorts the periphery of the image, the correction grid formed by the imaging through the lens 202 is distorted, especially at the edge of the image. In order to view a normal image and improve user experience, the distortion may be corrected by moving the to-be-adjusted grid points in the correction grid.

In the exemplary embodiments of the present disclosure, since the left and right eyes view the image through the first and second lens respectively, and the first and second lens are symmetrical, the first and second correction grids, formed on the imaging screen 207 after the initial grid is imaged through the lens 202, are symmetrical. After the correction grid at one side is formed, the correction grid at the other side may be obtained through the lens; further, when the distortion is corrected by adjusting the position of the to-be-adjusted grid point in the first correction grid, the position of the to-be-adjusted grid point in the second correction grid corresponding to the to-be-adjusted grid point in the first correction grid may be adjusted synchronously based on a displacement of the to-be-adjusted grid point in the first correction grid, to correct the distortion synchronously.

In S120, a circle is formed on the correction grid.

In the exemplary embodiments of the present disclosure, the forming a circle on the correction grid may include:
establishing a two-dimensional coordinate system on the correction grid; and
forming the circle with an origin of the two-dimensional coordinate system as a center and a distance from one of the plurality of to-be-adjusted grid points to the origin as a radius.

Figure 5:
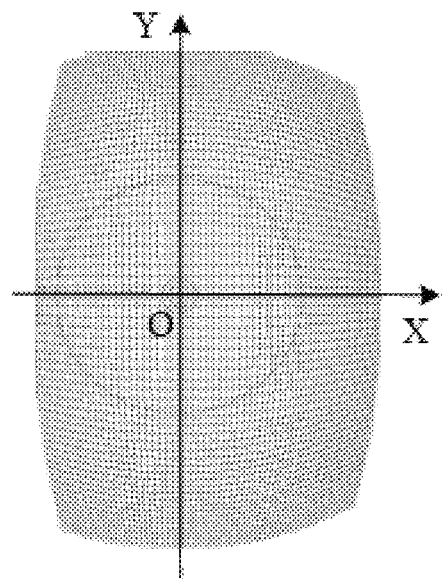
FIG. 5 is a schematic structural diagram of a correction grid according to exemplary embodiments of the present disclosure.

In the exemplary embodiments of the present disclosure, FIG. 5 is a schematic structural diagram of forming the correction grid of the two-dimensional coordinate system. As shown in FIG. 5, the two-dimensional coordinate system may be formed by taking an orthographic projection point of the center of the lens 202 on the display screen as the origin, forming an X axis passing through the origin in a horizontal direction, and forming a Y axis in a vertical direction, and this two-dimensional coordinate system may be imaged on the correction grid through the lens 202.

Persons skilled in the art should understand that the formation of the two-dimensional coordinate system along the X and Y axes is a merely schematic explanation of the formation of two-dimensional coordinate system according to the present disclosure. Certainly, the two-dimensional coordinate system may also be formed in an angular direction with respect to the X and Y axes, and the present disclosure has no limitation in this aspect. In addition, persons skilled in the art should also understand that the origin of the two-dimensional coordinate system may be adjusted correspondingly based on actual requirements. According to an embodiment, the origin of the two-dimensional coordinate system may be the position corresponding to the optical center of the lens or the position where the visual center of the user is located.

In S130, the to-be-adjusted grid points on and outside the circle are moved to correct image distortion.

In the exemplary embodiments of the present disclosure, the moving the to-be-adjusted grid points on and outside the circle to correct image distortion may include: moving the to-be-adjusted grid points located on and outside the circle with an origin of the two-dimensional coordinate system as a center and the distance from one of the plural to-be-adjusted grid points to the origin as a radius, to correct image distortion.

In the exemplary embodiments of the present disclosure, a circle may be formed with the origin of the two-dimensional coordinate system formed on the display screen 204 as a center and the distance from the initial grid point corresponding to the to-be-adjusted grid point to the origin (circle center) as a radius; this circle is imaged on the imaging screen through the lens 202; and then the to-be-adjusted grid points on and outside the circle are adjusted, such that the grid line of the correction grid is straight, thereby further correcting image distortion.

Figure 6:
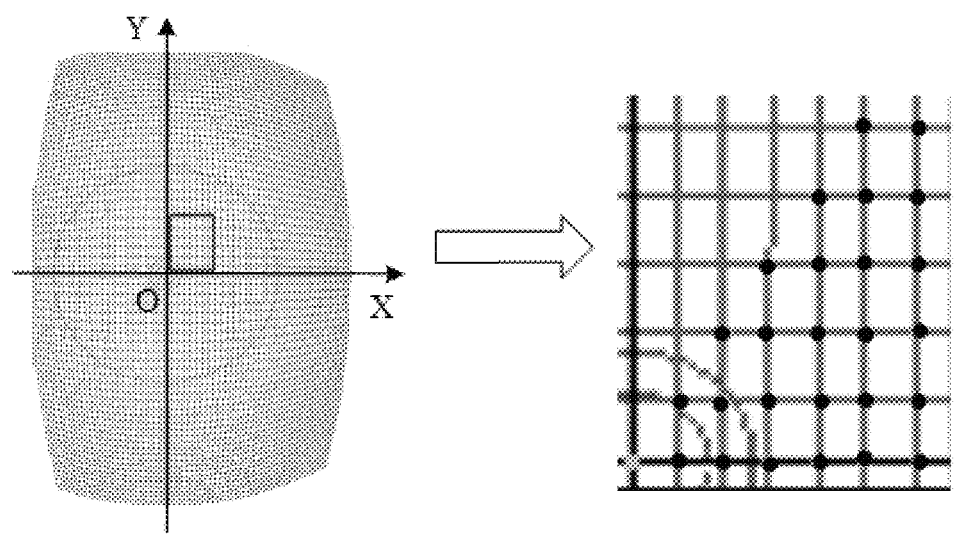
FIG. 6 is a schematic structural diagram and a local enlarged diagram of a correction grid according to exemplary embodiments of the present disclosure.

In the exemplary embodiments of the present disclosure, FIG. 6 is a schematic structural diagram and a partially enlarged view. As shown in FIG. 6, dots at the intersections of vertical and horizontal grid lines of the correction grid are the to-be-adjusted grid points, and the dot O is used as the origin of the two-dimensional coordinate system. From FIG. 4, it is known that the left and right portions of the correction grid are not symmetrical with respect to the Y axis. For the correction grid corresponding to the right eye, an area of the correction grid located at the left side of a vertical axis of the two-dimensional coordinate system is less than the area of the correction grid at the right side of the vertical axis. Correspondingly, for the correction grid corresponding to the left eye, an area of the correction grid located at the left side of a vertical axis of the two-dimensional coordinate system is greater than the area of the correction grid at the right side of the vertical axis. When the circle is formed with the origin O as a circle center and the distance from one to-be-adjusted grid point away from the origin O to the origin as a radius, since a part of the circle may exceed the range of the display image, there may be two to-be-adjusted grid points in total on this circle. When one of the to-be-adjusted grid points is adjusted, the other is also adjusted; when the circle is formed with the origin O as a circle center and the distance from one to-be-adjusted grid point close to the origin O to the origin as a radius, there may be four to-be-adjusted grid points in total on this circle. When one of the to-be-adjusted grid points is adjusted, the other three are also adjusted. Since the correction grids corresponding to the left and right eyes are symmetrical, when a certain to-be-adjusted grid point is adjusted, correspondingly, four or eight to-be-adjusted grid points are also adjusted. That is, when a certain to-be-adjusted grid point in the correction grid is corrected, there may be a plurality of to-be-adjusted grid points which are also adjusted.

Figure 7:
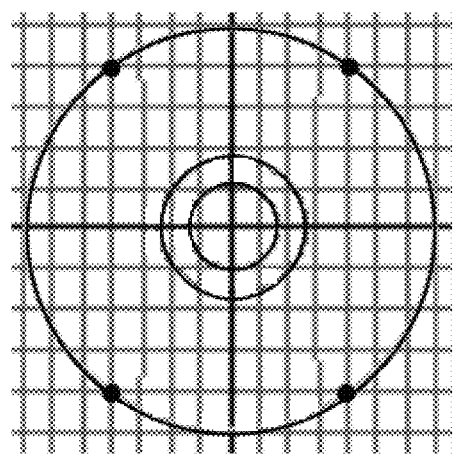
FIG. 7 shows concentric circles including to-be-adjusted grid points according to exemplary embodiments of the present disclosure.

Since the correction grid is formed on the imaging screen 207 by imaging the initial grid through the lens 202, the grid point corresponding to the to-be-adjusted grid point in the correction grid may be found in the initial grid. After the to-be-adjusted grid point is determined, the distance from the to-be-adjusted grid point or its corresponding grid point in the initial grid to the origin may be calculated and recorded, and then a group of concentric circles is formed on the initial grid with the origin O as a center and the recorded distances from all to-be-adjusted grid points to the origin as a radius, and the to-be-adjusted grid points located on and outside circles are adjusted in the direction away from the circle center; or only one circle is formed on the initial grid, with the distance from one to-be-adjusted grid point to the origin as a radius, a next to-be-adjusted grid point is selected according to the correction requirement, another circle is formed with the distance from the next to-be-adjusted grid point to the origin as a radius, and the to-be-adjusted grid points on and outside the circle are moved to correct distortion. Further, due to the imaging through the lens, a group of concentric circles or one circle is also formed on the correction grid. FIG. 7 is a schematic diagram of a group of concentric circles formed on the correction grid. In order to correct distortion, the circle where the to-be-adjusted grid points which are required to be adjusted are located may be selected from the concentric circles according to whether the grid lines in the correction grid are straight, and the to-be-adjusted grid points on and outside different circles are adjusted many times, to correct image distortion.

Figure 8A:
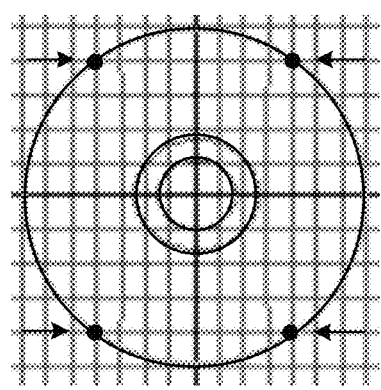
FIGS. 8A-8D are a-schematic diagrams of moving to-be-adjusted grid points according to exemplary embodiments of the present disclosure.
Figure 8B:
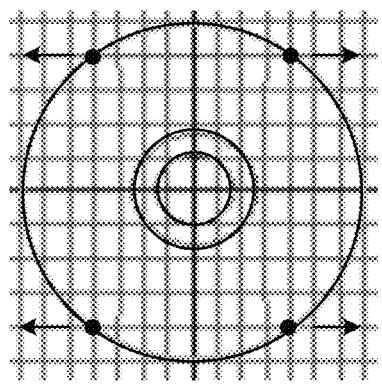
Figure 8C:
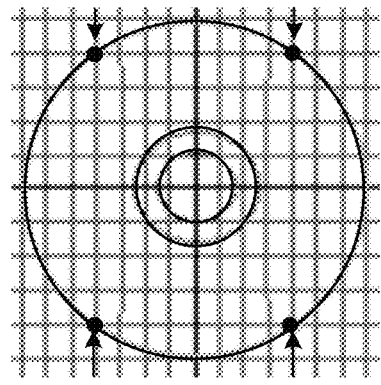
Figure 8D:
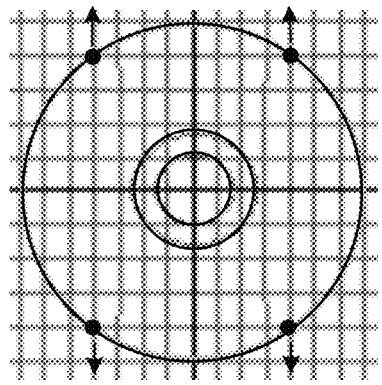

In the exemplary embodiments of the present disclosure, after the circle where the to-be-adjusted grid points which are required to be adjusted are located is determined, the circle on the initial grid corresponding to this circle may be adjusted. FIGS. 8A-8D are schematic diagrams of moving the to-be-adjusted grid points. As shown in FIGS. 8A-8B, the to-be-adjusted grid points move in a direction parallel with an abscissa axis of the two-dimensional coordinate system; as shown in FIGS. 8C-8D, the to-be-adjusted grid points move in a direction parallel with an ordinate axis of the two-dimensional coordinate system. In the present disclosure, by adjusting the to-be-adjusted grid points on and outside the circle in the direction parallel with the abscissa axis or the ordinate axis of the two-dimensional coordinate system, the grid lines where the to-be-adjusted grid points in the correction grid are located are made straight.

In the exemplary embodiments of the present disclosure, the to-be-adjusted grid points on and outside the circle may be adjusted by an external device connected with the virtual reality device 200, such as a keyboard, a handle, or the like or by a component arranged in the virtual reality device 200, such as an embedded adjusting knob, or the like; the to-be-adjusted grid points may move in the direction parallel with the abscissa axis of the two-dimensional coordinate system under the control of the adjusting device (component), and the adjustment is repeated, until the grid lines on the correction grid are straight. The above-mentioned step is repeated until the adjustments of all to-be-adjusted grid points are finished, and then the adjusted position of the to-be-adjusted grid points may be saved to avoid the distortion occurring in subsequent uses of the virtual reality device.

In the exemplary embodiments of the present disclosure, the to-be-adjusted grid points may be adjusted in sequence in the direction away from the origin, to correct distortion. Specifically, when the to-be-adjusted grid points are moved, only the to-be-adjusted grid points on and outside the circle are moved with respect to the origin under the control of an adjusting device (component), whereas the position of the to-be-adjusted grid points having a distance less than the circle radius is not changed (which is already adjusted). In this way, during the adjustment, the points on the grid are divided into to-be-adjusted points and adjusted points, and based on the change in positions of the to-be-adjusted points and the adjusted points, the efficiency of distortion correction may be improved.

In the exemplary embodiments of the present disclosure, when a to-be-adjusted grid point on and outside the circle is moved, other to-be-adjusted grid points on and outside the circle also move close to or away from the origin, thereby further improving the correction efficiency.

In order to meet the requirements of different users and taking differences in the pupil distances and experience of users into consideration, the to-be-adjusted grid points in the correction grid may be moved using different visual parameters (such as distance of exit pupil, object distance, screen size, or the like) based on the method of correcting image distortion according to the present disclosure, to obtain the positions of a plurality of groups of adjusted to-be-adjusted grid points. According to the positions of the plurality of groups of to-be-adjusted grid points before and after adjustment, the displacements of the plurality of groups of to-be-adjusted grid points are obtained. By averaging the plurality of groups of displacements, the final adjustment positions of the to-be-adjusted grid points may be obtained. As the averaging method, weighted averaging, arithmetic averaging, or the like may be used, and the present disclosure has no limitation in this aspect.

Further, the method of correcting image distortion according to the present disclosure may also be used for correcting distortion in different colors. Specifically, a subcorrection grid may be formed on an image in different colors, and then the to-be-adjusted grid points in the subcorrection grid are adjusted, such that the gird lines of the subcorrection grid are straight, thereby correcting distortion in different colors. Certainly, in order to improve the correction accuracy and meet requirements of different users, the distortion in different colors may be corrected many times to obtain the relative displacements of the plurality of groups of adjusted to-be-adjusted grid points to the to-be-adjusted grid points before adjustment, and then the plurality of groups of relative displacements is averaged to obtain the final adjustment positions.

With the method of correcting image distortion according to the embodiments of the present disclosure, on one hand, the image distortion is corrected and user experience is improved; on the other hand, only the to-be-adjusted grid points on and outside the circle where a to-be-adjusted grid point is located are adjusted to correct image distortion and the correction efficiency is improved.

Figure 9:
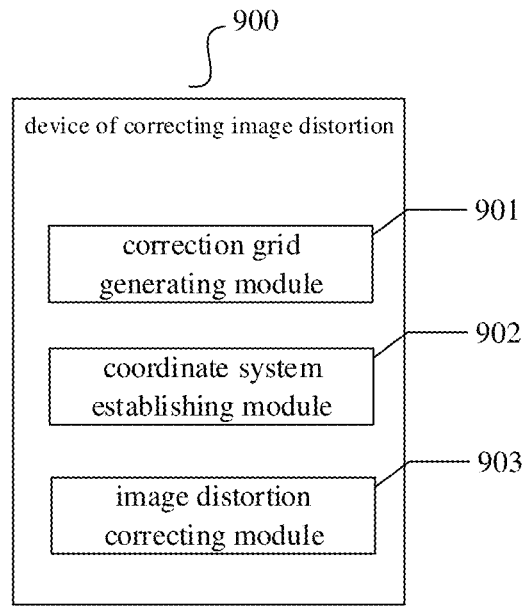
FIG. 9 is a schematic structural diagram of a device of correcting image distortion according to exemplary embodiments of the present disclosure.

The present disclosure further provides a device of correcting image distortion. FIG. 9 is a schematic structural diagram of a device 900 of correcting image distortion. As shown in FIG. 9, the device 900 of correcting image distortion includes a correction grid generating module 901, a coordinate system establishing module 902, and an image distortion correcting module 903.

The correction grid generating module 901 is configured for forming a correction grid on an imaging screen of a display device, and the correction grid includes a plurality of to-be-adjusted grid points.

The coordinate system establishing module 902 is configured for forming a circle on the correction grid.

The image distortion correcting module 903 is configured for moving the to-be-adjusted grid points on and outside the circle, to correct image distortion.

In the exemplary embodiments of the present disclosure, the coordinate system establishing module 902 is further configured for:
establishing a two-dimensional coordinate system on the correction grid;
forming the circle with an origin of the two-dimensional coordinate system as a center and a distance from one of the plurality of to-be-adjusted grid points to the origin as a radius.

In the exemplary embodiments of the present disclosure, the image distortion correcting module 903 is further configured for: moving the to-be-adjusted grid points located on and outside the circle with an origin of the two-dimensional coordinate system as a center and the distance from one of the plurality of to-be-adjusted grid points to the origin as a radius, to correct image distortion.

Figure 10:
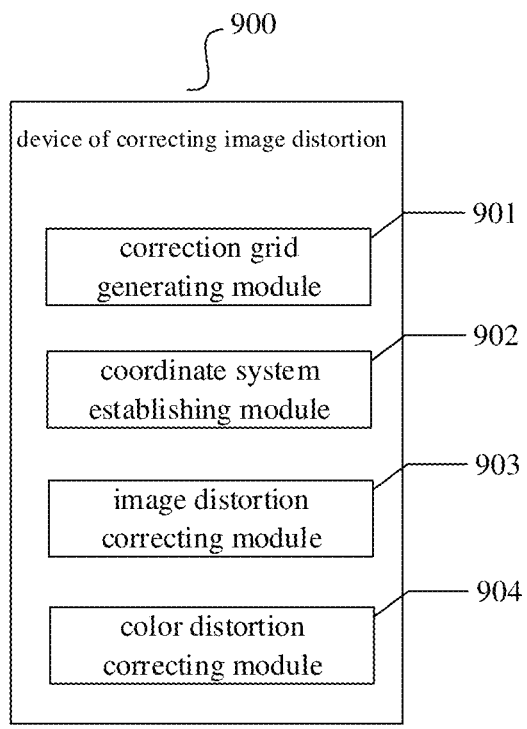
FIG. 10 is a schematic structural diagram of a device of correcting image distortion according to exemplary embodiments of the present disclosure.

In the exemplary embodiments of the present disclosure, FIG. 10 is a schematic structural diagram of the device 900 of correcting image distortion. As shown in FIG. 10, the device 900 of correcting image distortion further includes a color distortion correcting module 904, configured for obtaining a plurality of subcorrection grids corresponding to different colors and adjusting the subcorrection grids respectively, so as to correct the distortion in different colors.

The modules in the above-mentioned device of correcting image distortion have been described in detail in the corresponding method of correcting image distortion, and are not repeated herein.

It should be noted that although a number of modules or units of the device for action execution are mentioned in the above detailed description, such division is not mandatory. In fact, according to embodiments of the present disclosure, the features and functions of two or more modules or units described above may be embodied in a module or unit. Conversely, the features and functions of a module or unit described above may be further subdivided into a plurality of modules or units.

In addition, although the various steps of the method of the present disclosure have been described in a particular order in the drawings, it is not intended or implied that the steps must be performed in that particular order or all of the steps shown must be performed to achieve the desired result. Additionally, some steps may be omitted, several steps may be combined into one step, and/or a step may be decomposed into several steps.

It will be readily understood by those skilled in the art from the description of the above embodiments that the exemplary embodiments described herein may be implemented by software or by means of software in conjunction with the necessary hardware. Thus, the technical solution according to the embodiments of the present disclosure may be embodied in the form of a software product which may be stored on a non-volatile storage medium (which may be a CD-ROM, a USB flash disk, a mobile hard disk, etc.) or on a network, which includes a number of instructions to enable a computing device (which may be a personal computer, a server, a mobile terminal, or a network device, etc.) to perform a method according to the embodiments of the present disclosure.

In the exemplary embodiments of the present disclosure, an electronic device for implementing the above-mentioned method is further provided.

As can be understood by one skilled in the art, aspects of the present invention may be embodied as a system, method or program product. Accordingly, aspects of the present invention may take the form of an entirely hardware embodiment, an entirely software embodiment (including firmware, micro-code, etc.) or an embodiment combining software and hardware aspects, which may all generally be referred to herein as a "circuit," "module" or "system."

Hereinafter, the electronic device 1100 according to the exemplary embodiments of the present disclosure will be described with reference to FIG. 11. The electronic device 1100 shown in FIG. 11 is merely an example, and should not limit the functionality and the scope of use of the embodiments of the present disclosure.

Figure 11:
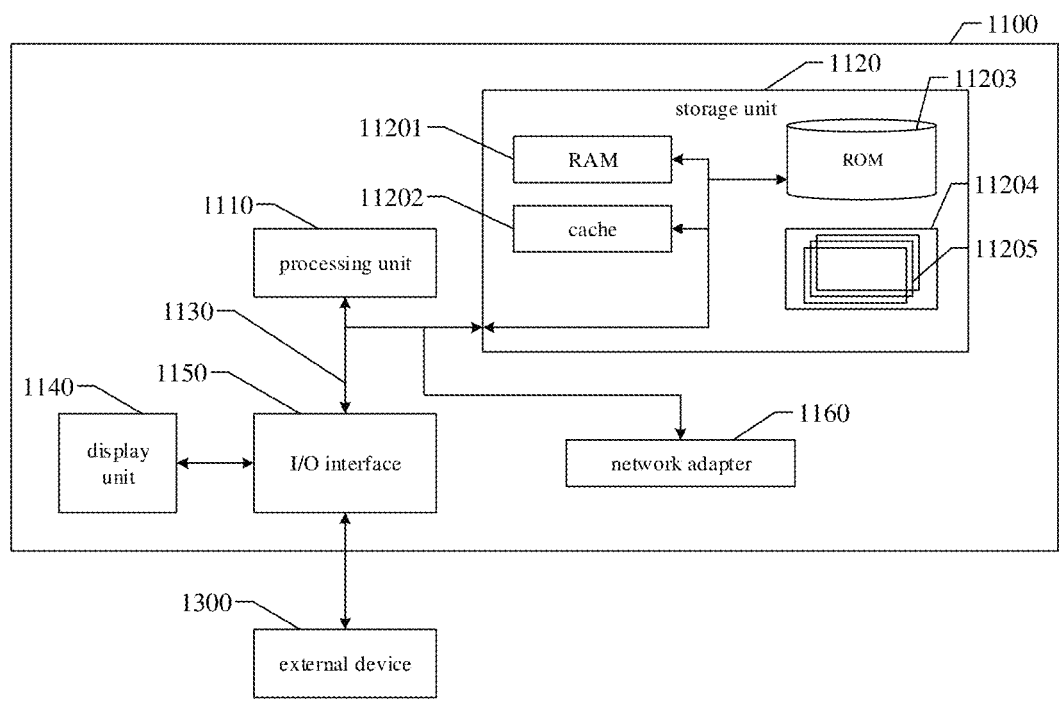
FIG. 11 is a schematic structural diagram of a computer readable medium according to exemplary embodiments of the present disclosure.

As shown in FIG. 11, the electronic device 1100 may be embodied as a general-purpose computing device. The electronic device 1100 may include, but is not limited to the above-mentioned at least one processing unit 1110, the above-mentioned at least one memory 1120, and a bus 1130 for connecting different system components (including the memory 1120 and the processing unit 1110).

The memory stores program codes which may be executed by the processing unit 1110, such that the processing unit 1110 performs the steps described in the above-mentioned "exemplary method" in the specification according to various exemplary embodiments of the present disclosure. For example, the processing unit 1110 may perform the following steps shown in FIG. 1: S110: forming a correction grid on an imaging screen of a display device, the correction grid including a plurality of to-be-adjusted grid points; S120: forming a circle on the correction grid; and S130: moving the to-be-adjusted grid points on and outside the circle, to correct image distortion.

The memory 1120 may include a readable medium in the form of volatile memory, such as a random access memory (RAM) 11201 and/or a cache memory 11202, and may further include a read only memory (ROM) 11203.

The memory 1120 may further include a program/utility tool 11204 of a group (at least one) program module 11205. Such program module 11205 includes, but is not limited to, an operating system, one or more applications, other program modules and program data, and each or a certain combination of these examples may include the implementation of the network environment.

The bus 1130 may represent one or more of several types of bus structures, including a memory bus or a memory controller, a peripheral bus, an accelerated graphics port, and a processing unit or a local bus using any of a variety of bus architectures.

The electronic device 1100 may also communicate with one or more external devices 1300 (for example, a keyboard, a pointing device, a Bluetooth device, or the like), one or more devices which enable the user to interact with the electronic device 1100, and/or any device (such as a router, a modem, or the like) which enables this electronic device 1100 to communicate with one or more other computing devices. This communication may be performed by an input/output (I/O) interface 1150. The electronic device 1100 may also communicate with one or more networks (such as a local area network (LAN), a wide area network (WAN), and/or a public network (e.g., the Internet)) via a network adapter 1160. As shown in the drawings, the network adapter 1160 communicates with other modules of the electronic device 1100 via the bus 1130. It should be understood that although not shown, the electronic device 1100 may be used with other hardware and/or software modules, including, but not limited to micro-codes, a device drive, a redundant processing unit, an external magnetic disk drive array, a RAID system, a magnetic tape drive, a data backup storage system, or the like.

It could be readily understood by those skilled in the art from the description of the above embodiments that the exemplary embodiments described herein may be implemented by software or by means of software in conjunction with necessary hardware. Thus, the technical solution according to the embodiments of the present disclosure may be embodied in the form of a software product which may be stored on a non-volatile storage medium (which may be a CD-ROM, a USB flash disk, a mobile hard disk, etc.) or on a network, and includes a number of instructions to enable a computing device (which may be a personal computer, a server, a mobile terminal, or a network device, etc.) to perform a method according to the embodiments of the present disclosure.

In the exemplary embodiments of the present disclosure, there is further provided a computer readable storage medium storing a program product for implementing the above-mentioned method of the present specification. In some possible embodiments, various aspects of the present disclosure may be embodied in the form of a program product, including program codes which, when run on the terminal device, causes the terminal device to perform the steps described in the above-mentioned "exemplary method" in the specification according to various exemplary embodiments of the present disclosure.

Figure 12:
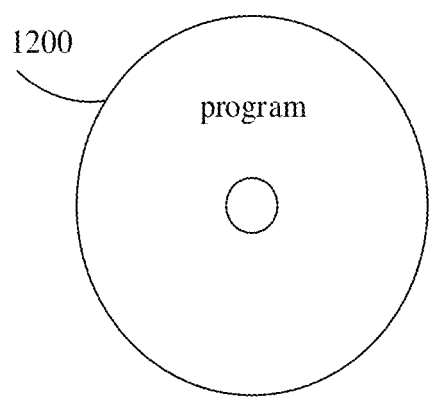
FIG. 12 is a schematic structural diagram of an electronic device according to exemplary embodiments of the present disclosure.

Referring to FIG. 12, there is described a program product 1200 for implementing the above-mentioned method according to the embodiments of the present disclosure. The program product may be a portable compact disc read-only memory (CD-ROM), include a program codes which may be run on a terminal device, such as a personal computer. However, the program product according to the present disclosure is not limited thereto. In the context of this document, a readable storage medium may be any tangible medium that may contain, or store a program for use by or in connection with an instruction execution system, apparatus, or device.

As the program product, any combination of one or more readable medium(s) may be utilized. The readable medium may be a readable signal medium or a readable storage medium. The readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the readable storage medium would include the following: an electrical connection having one or more wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The computer readable signal medium may include a data signal carrying readable program codes, for example, propagated in baseband or as part of a carrier wave. Such propagated data signal may take a variety of forms, including, but not limited to, electro-magnetic signal, optical signal, or any suitable combination thereof. The readable signal medium may also be any readable medium other than a readable storage medium and may communicate, propagate, or transport a program for use by or in connection with an instruction execution system, apparatus, or device.

The program code stored on the readable medium may be transmitted using any appropriate medium, including but not limited to wireless medium, wired medium, optical fiber cable, RF, etc., or any suitable combination of the foregoing. Computer program code for carrying out operations of the present invention may be written in any combination of one or more programming languages, including an object oriented programming language such as Java, C++ or the like and conventional procedural programming languages, such as the "C" programming language or similar programming languages. The program code may be executed entirely on the user's computing device, partly on the user's device, as a stand-alone software package, partly on the user's computing device and partly on a remote computing device or entirely on the remote computing device or server. In the scenario related to a remote computing device, the remote computing device may be connected to the user's computing device through any type of network, including a local area network (LAN) or a wide area network (WAN), or may be made to an external computing device (for example, through the Internet by using an Internet Service Provider).

Further, the above-described drawings are merely illustrative of the processes included in the method according to the exemplary embodiments of the present disclosure, and are not intended to be limiting. It should be understood that the processing shown in the above figures does not indicate or limit the chronological order of these processes. In addition, it should be understood that these processes may be performed synchronously or asynchronously, for example, in a plurality of modules.

Other embodiments will readily occur to those skilled in the art upon consideration of the specification and practice of the invention disclosed herein. The present application is intended to cover any variations, uses, or adaptations of the present disclosure, which are in accordance with the general principles of the disclosure and include common general knowledge or common technical means in the art that are not disclosed in the present disclosure. The specification and examples are to be regarded as illustrative only, and the true scope and spirit of the present disclosure are indicated by the claims.

What is claimed is:

1. A method of correcting image distortion, comprising:
forming an initial grid on a display screen of a display device based on an optical parameter of the display device;
imaging the initial grid through a lens arranged at a side of the display screen, to form a correction grid on the imaging screen, the correction grid comprising a plurality of to-be-adjusted grid points;
establishing a two-dimensional coordinate system on the correction grid;
forming a group of concentric circles on the initial grid with an origin of the two-dimensional coordinate system as a center and distances from the plurality of to-be-adjusted grid points to the origin as radii; and
adjusting the plurality of to-be-adjusted grid points on the group of concentric circles in sequence in the direction away from the origin, to correct image distortion,
wherein the adjusting the plurality of to-be-adjusted grid points on the group of concentric circles in sequence in the direction away from the origin comprises:
moving grid points on and outside a being adjusted concentric circle of the group of concentric circles, and keeping already adjusted grid points on concentric circles each having a radius less than the radius of the being adjusted concentric circle still.

2. The method of correcting image distortion according to claim 1, wherein the display device comprises a first lens and a second lens which are symmetrically arranged; and
the forming the correction grid on the imaging screen comprises:
imaging the initial grid through the first lens and the second lens, to form a first correction grid and a second correction grids on the imaging screen, wherein the first correction grid and the second correction grid are symmetrical to each other.

3. The method of correcting image distortion according to claim 2, further comprising:
adjusting the to-be-adjusted grid point in the first correction grid; and
adjusting the position of the to-be-adjusted grid point in the second correction grid corresponding to the to-be-adjusted grid point in the first correction grid synchronously, based on a displacement of the to-be-adjusted grid point in the first correction grid.

4. The method of correcting image distortion according to claim 1, wherein the establishing the two-dimensional coordinate system on the correction grid comprises:
establishing the two-dimensional coordinate system in a horizontal direction and a vertical direction by taking an orthographic projection point of the center of the lens on the display screen as the origin; and
imaging the two-dimensional coordinate system on the correction grid through the lens.

5. The method of correcting image distortion according to claim 1, further comprising:
selecting the to-be-adjusted grid point which is required to be adjusted, according to whether a grid line in the correction grid is straight, so as to adjust the to-be-adjusted grid point on and outside the concentric circle where the to-be-adjusted grid point which is required to be adjusted is located.

6. The method of correcting image distortion according to claim 1, wherein the moving grid points on and outside the being adjusted concentric circle of the group of concentric circles comprises:
moving the grid points in a direction parallel with an abscissa axis or an ordinate axis of the two-dimensional coordinate system to make a grid line of the correction grid straight.

7. The method of correcting image distortion according to claim 6, wherein all grid points located on and outside the being adjusted concentric circle also move close to or away from the center.

8. The method of correcting image distortion according to claim 1, further comprising:
adjusting the to-be-adjusted grid point repeatedly by using different visual parameters, and determining a final adjustment position based on a result of the repeatedly adjusting.

9. The method of correcting image distortion according to claim 1, further comprising:
obtaining a plurality of subcorrection grids corresponding to different colors, and adjusting the plurality of subcorrection grids to correct the distortion in the different colors.

10. A non-transitory computer readable medium, storing a computer program, which, when executed by a processor, implements the method of correcting image distortion according to claim 1.

11. An electronic device, comprising:
one or more processors;
a storage device, configured for storing one or more programs, which, when executed by the one or more processors, cause the one or more processors to implement the method of correcting image distortion according to claim 1.

12. A device of correcting image distortion, comprising:
a correction grid generating module, configured for forming an initial grid on a display screen of a display device based on an optical parameter of the display device and imaging the initial grid through a lens arranged at a side of the display screen, to form a correction grid on the imaging screen, the correction grid comprising a plurality of to-be-adjusted grid points;
a coordinate system establishing module, configured for establishing a two-dimensional coordinate system on the correction grid and forming a group of concentric circles on the initial grid with an origin of the two-dimensional coordinate system as a center and distances from the plurality of to-be-adjusted grid points to the origin as radii; and
an image distortion correcting module, configured for adjusting the plurality of to-be-adjusted grid points on the group of concentric circles in sequence in the direction away from the origin, to correct image distortion, wherein the image distortion correcting module is further configured for moving grid points on and outside a being adjusted concentric circle of the group of concentric circles, and keeping already adjusted grid points on concentric circles each having a radius less than the radius of the being adjusted concentric circle still.

13. A display device, comprising the device of correcting image distortion according to claim 12.

14. A method of correcting image distortion, comprising:
obtaining a correction grid corresponding to an initial grid, the correction grid comprising a plurality of to-be-adjusted grid points;
determining a reference point on a plane where the correction grid is located; and moving a to-be-adjusted grid point of the plurality of to-be-adjusted grid points having a distance to the reference point greater than or equal to a preset value, to correct image distortion, wherein the moving the to-be-adjusted grid point of the plurality of to-be-adjusted grid points having the distance to the reference point greater than or equal to the preset value to correct image distortion further comprises:

keeping a to-be-adjusted grid point of the plurality of to-be-adjusted grid points having a distance to the reference point less than the preset value still.

15. The method of correcting image distortion according to claim 14, further comprising:

selecting the to-be-adjusted grid point which is required to be adjusted, according to whether a grid line of the correction grid is straight.

16. The method of correcting image distortion according to claim 14, wherein the moving the to-be-adjusted grid point of the plurality of to-be-adjusted grid points having the distance to the reference point greater than or equal to the preset value to correct image distortion further comprises:

moving the to-be-adjusted grid point of the plurality of to-be-adjusted grid points having the distance to the reference point greater than or equal to the preset value to make the grid line where the moved to-be-adjusted grid point is located to be straight.

\* \* \* \* \*